June 10, 1952 F. W. FULLER 2,599,755
SHAKER FOR GRANULAR SUBSTANCES
Filed Jan. 26, 1946
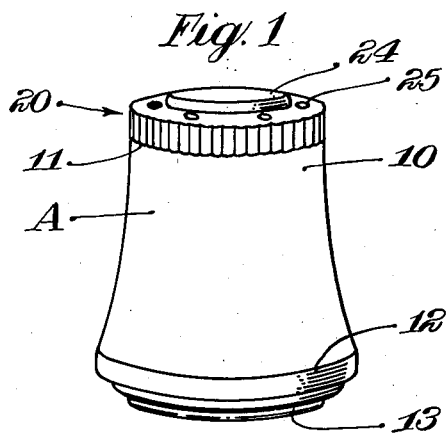
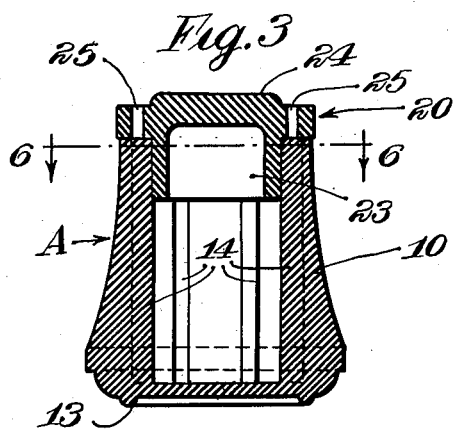
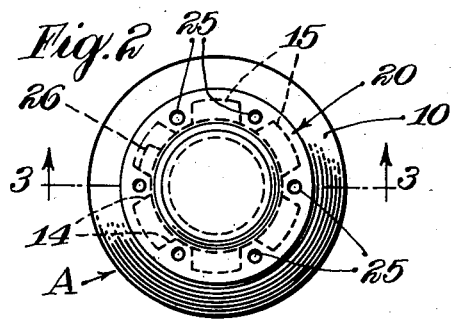
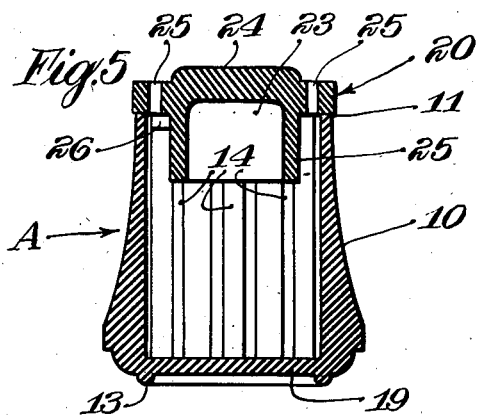
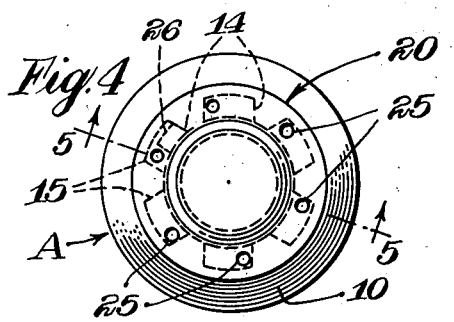
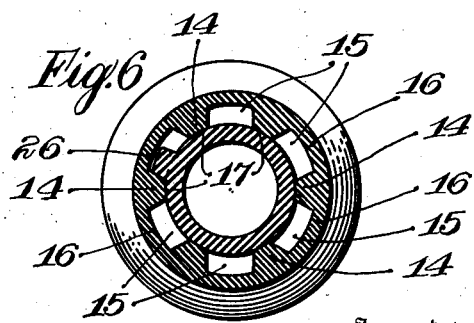
Inventor
Frank W. Fuller
By Robert M. Dunning
Attorney Patented June 10, 1952

2,599,755

UNITED STATES PATENT OFFICE 2,599,755

SHAKER FOR GRANULAR SUBSTANCES

Frank W. Fuller, St. Paul, Minn.

Application January 26, 1946, Serial No. 643,728

5 Claims. (Cl. 222—554)

My invention relates to an improvement in salt shakers wherein it is desired to provide a shaker for salt and the like having a means of closing the shaker openings.

Salt shakers and shakers used for other seasoning materials or the like are usually provided with apertured or perforated tops through which the salt or other material can be shaken. These openings or perforations in the top normally remain open at all times and thus permit a certain amount of moisture to enter the interior of the shaker. Furthermore should the shakers be tipped over accidentally the contents will normally spill out. Thus even though shakers having normally open apertures therethrough may be used effectively in the home, they are not particularly suitable for use on planes, trains, or the like, and are not particularly adaptable for use in picnic kits or picnic baskets.

Shakers have been constructed embodying a means for closing the openings or perforations therein. Such shakers, however, have usually been relatively expensive to manufacture and require some valve means which is not ordinarily required. It is an object of the present invention to provide a shaker which is extremely simple in form and which at the same time may be sealed effectively when not in use.

It is an object of the present invention to provide a shaker for salt and the like having a body and a top rotatably supported thereupon. The top is perforated to permit the contents of the body to pass therethrough in one rotative position of the top. When rotated to a different angular position the apertures are closed by portions of the body to form an effective seal.

A feature of the present invention lies in the provision of a salt shaker including a body having an aperture therein and a head which is frictionally engaged therein. A means is provided on the head to limit pivotal movement so that in one extreme position the openings in the top or head are in communication with the aperture, while in the other extreme position the openings in the top are closed by portions of the body.

A further feature of the present invention resides in the provision of a salt shaker including a body provided with inwardly extending ribs therein which frictionally engage against an inserted portion of a plug top. Apertures are formed in the top which in one rotative position communicate with the interior of the body between the ribs and in another rotative position are sealed by the upper ends of the ribs.

A further feature of the present invention lies in the provision of a salt shaker having an apertured body formed by alternate thick wall sections and thin wall sections. A plug cap is frictionally engaged within the thick wall sections which project into the body. The plug cap is of a diameter equal to or slightly larger than the interior diameter of the thick wall sections. As a result the thin wall sections are flexed somewhat upon insertion of the cap so as to provide a tight frictional engagement between the cap and the body.

These and other objects and novel features of my invention will be more clearly and fully set forth in the following specification and claims.

In the drawings forming a part of my specification:

Figure 1 is a perspective view of a shaker showing my new construction.

Figure 2 is a top plan view of the shaker illustrated in Figure 1.

Figure 3 is a vertical section through the shaker, the position of the section being indicated by the line 3—3 of Figure 2.

Figure 4 is a view similar to Figure 2 showing the cap or top of the shaker in a different rotative position.

Figure 5 is a vertical section through the shaker the position of the section being indicated by the line 5—5 of Figure 4.

Figure 6 is a transverse section through the section just below the top thereof, the position of the section being indicated by the line 6—6 of Figure 3.

Figure 7 is a side elevational view of the top removed from the body.

The shaker A, illustrated in the drawings, may be of any preferred or desired shape. As illustrated, the shaker includes a body having a body 10 having a tapered construction. The body 10 tapers from the circular upper end 11 to the large diameter portion 12 near the base 13 thereof. This construction insures a low center of gravity and a relatively wide base to lessen the tendency of the body to tip over. The outer shape of the shaker, however, is not important in the present invention.

The body 10 is provided with vertical ribs 14 extending inwardly from the body wall and producing grooves therebetween. In other words, the interior body wall is formed of relatively thick sections 14 and relatively thin sections 16 in alternating relationship. The inner surfaces 17 of the ribs 14 are arranged on a cylindrical plane concentric with the body 10.

In preferred form the body 10 is formed of plastic, or the like, which provides a certain amount of inherent resilience. The ribs 14 are shown extending the full depth of the interior of the body from the top 11 thereof to the bottom wall 19 thereof to insure simplicity in casting the body. These ribs 14, however, do not necessarily extend the full depth of the body and may be provided only near the upper extremity thereof.

The cap 20 is formed as best illustrated in Figure 7 of the drawings. The cap includes a peripheral flange 21 having a knurled or ribbed outer surface and includes a depending cylindrical shank 22. The shank 22 may have a hollow inherent recess 23 therein if desired to cut down the amount of material necessary to form the top and to likewise reduce the weight of the shaker at the upper end thereof. Thus in effect the shank 22 is in the form of a depending cylindrical skirt or sleeve. The center portion 24 of the external surface of the cap may be elevated as illustrated to enhance the appearance of the top and to serve as a means of distributing the salt shaken through the cap apertures.

The cap 20 is provided with apertures 25 therethrough in angularly spaced relationship. These apertures 25 are spaced the same angular amount as the ribs 14. As a result the number of apertures 25 provided equals the number of ribs 14. Obviously by increasing the size of the ribs 14 or decreasing the size of the apertures 25 a series of apertures may be provided for each rib 14 in place of the single aperture 25 illustrated.

A lug 26 is provided on the outer surface of the shank 22. This lug 26 is designed to extend into one of the grooves 15 between spaced adjacent ribs 14 and is of proper width to permit the cap 20 to rotate a desired amount relative to the body 10. As indicated in Figure 2 of the drawings when the cap 20 is in one extreme position the lug 26 will engage a rib 14 on one side of a predetermined groove 15. When the cap is rotated slightly in a clockwise direction from the position shown in Figure 2, the lug 26 will strike the second rib 14 defining the groove 15 in which the lug is located. Thus the lug 26 limits rotative movement of the cap between two defined limits.

As will be obvious from Figure 2 of the drawings when the cap is in the extreme position illustrated in this figure, the apertures 25 will be in alignment with the ribs 14 and these apertures 25 will not communicate with the interior of the body 10. However, when the cap 20 is rotated into the position shown in Figure 4 of the drawings the apertures 25 will register with the grooves 15 between the ribs 14 and the contents of the shaker may be dispersed.

In the formation of the body and cap the outer diameter of the shank 22 of the cap 20 is equal to or slightly greater than the inner diameter of the ribs 14. Thus in inserting the cap 20 in place the ribs 14 are forced outwardly to a slight extent. This outward flexing of the ribs 14 is compensated for by a slight flexing of the relatively thin wall sections 16 between the ribs 14. In other words the upper portion of the body is flexed slightly out of round by the insertion of the cap 20. The shank 22 of the cap may be tapered slightly to facilitate insertion into the body if it is so desired.

The operation of the shaker is obvious from the foregoing description. The body 10 is filled with salt or any other fine or granular substance. The cap 20 is inserted into the open end of the body, the body flexing somewhat to permit this insertion. The top is therefore frictionally engaged in the top of the body. During the insertion the cap is rotated so that the lug 26 extends between any two spaced ribs 14 of the body.

Upon rotation of the cap in one direction the apertures 25 will be sealed as indicated in Figures 2 and 3 of the drawings. When rotated to the other extreme position as illustrated in Figures 4 and 5 the apertures 25 will communicate with the interior of the body and will permit the dispensing of the product contained therein.

In accordance with the patent statutes, I have described the principles of construction and operation of my shaker, and while I have endeavored to set forth the best embodiment thereof, I desire to have it understood that obvious changes may be made within the scope of the following claims without departing from the spirit of my invention.

I claim:
1. A shaker for salt and the like comprising a hollow body having an opening therein; a series of angularly spaced thickened portions on said body forming projections extending inwardly adjacent said opening, a plug type closure for said opening designed to be supported between said projections, said closure including a flange overlying the ends of said thickened portions and the intervening spaces, said flange having openings therein registrable selectively with said thickened portions and said intervening spaces.

2. The structure defined in claim 1 and including means on said closure engageable between two adjacent projections to limit rotative movement of said closure relative to said body.

3. A salt shaker comprising a hollow body having an opening therein, a plurality of angularly spaced grooves in said body adjacent said aperture, a plug type closure for said opening including a flange overlying the grooved portion of said body, said closure being frictionally supported within said opening by said body, and said closures having apertures therein equally spaced to, and movable into and out of registry with, said grooves.

4. A shaker for salt and the like comprising a hollow body, an opening in said body, a series of angularly spaced grooves in said body communicating with said opening, a plug type closure frictionally engaged in said opening and including a portion extending over said grooves, said closure portion having openings therein spaced similarly to said grooves and registrable therewith, said closure being movable to move the openings into and out of registry with said grooves.

5. The structure defined in claim 4 and including a means in said closure engageable in one of said grooves in said body for limiting the relative rotation between said closure and said body.

FRANK W. FULLER.

REFERENCES CITED

The following references are of record in the file of this patent:

UNITED STATES PATENTS

| Number | Name | Date |
| --- | --- | --- |
| 780,292 | Jones | Jan. 17, 1905 |
| 834,096 | Williamson | Oct. 23, 1906 |
| 903,548 | De Hayes | Nov. 10, 1908 |
| 913,026 | Meaker | Feb. 23, 1909 |
| 1,346,007 | De Aguiar | July 6, 1920 |
| 1,576,151 | Slick | Mar. 9, 1926 |
| 1,649,230 | Hothersall | Nov. 15, 1927 |
| 1,801,241 | Styx | Apr. 14, 1931 |
| 1,861,980 | Rundell | June 7, 1932 |
| 2,029,997 | Gaddy | Feb. 4, 1936 |
| 2,136,805 | Scharinger | Nov. 15, 1938 |
| 2,160,602 | Nagel | May 30, 1939 |
| 2,185,576 | Tarantolo | Jan. 2, 1940 |
| 2,344,801 | Chase | Mar. 21, 1944 |
| 2,373,551 | Delauder | Apr. 10, 1945 |

FOREIGN PATENTS

| Number | Country | Date |
| --- | --- | --- |
| 11,723 | Great Britain | Aug. 14, 1888 |